(12) United States Patent
Tasaka et al.

(10) Patent No.: US 9,796,395 B2
(45) Date of Patent: Oct. 24, 2017

(54) TRANSPORT MECHANISM

(71) Applicant: TOYOTA JIDOSHA KABUSHIKI KAISHA, Toyota-shi (JP)

(72) Inventors: Masahiro Tasaka, Nissin (JP); Tadayuki Komoto, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 81 days.

(21) Appl. No.: 15/070,542

(22) Filed: Mar. 15, 2016

(65) Prior Publication Data

US 2016/0272221 A1    Sep. 22, 2016

(30) Foreign Application Priority Data

Mar. 19, 2015    (JP) .................................. 2015-056802

(51) Int. Cl.

| *B61B 13/04* | (2006.01) |
|---|---|
| *B65G 1/06* | (2006.01) |
| *B66B 11/04* | (2006.01) |
| *B66B 9/02* | (2006.01) |
| *B61B 13/02* | (2006.01) |
| *B61B 15/00* | (2006.01) |

(52) U.S. Cl.
CPC .............. *B61B 13/04* (2013.01); *B61B 13/02* (2013.01); *B61B 15/00* (2013.01); *B65G 1/065* (2013.01); *B66B 9/022* (2013.01); *B66B 11/0461* (2013.01)

(58) Field of Classification Search
CPC ......... F16H 1/203; B61B 13/02; B61B 13/04; B61B 11/04; B61B 15/00; A61G 5/04; B61C 11/04; B65G 1/065; B66B 9/022; B66B 9/0815; B66B 9/0853; B66B 9/187; B66B 9/16; B66B 11/0461
USPC .......................................................... 104/96
See application file for complete search history.

(56) References Cited

U.S. PATENT DOCUMENTS

| 1,859,483 | A | * | 5/1932 | Winslow ................. B66B 9/003 187/270 |
| 5,096,354 | A | * | 3/1992 | Wu ......................... B61C 11/04 414/265 |

(Continued)

FOREIGN PATENT DOCUMENTS

| JP | 57-51682 A | 3/1982 |
| JP | 6-87436 A | 3/1994 |

(Continued)

*Primary Examiner* — Zachary L Kuhfuss
(74) *Attorney, Agent, or Firm* — Oblon, McClelland, Maier & Neustadt, L.L.P.

(57) ABSTRACT

A transport mechanism for transporting a travel body that can self travel and includes: a motor; a drive wheel to which rotary torque of the motor is transmitted; and a first gear to which the rotary torque of the motor is transmitted is provided. The transport mechanism includes: a transport body configured on which the travel body is placed for transportation, the transport body including a second gear that can mesh with the first gear of the placed travel body; a movement mechanism for moving the transport body, on which the travel body is placed, by the rotary torque of the motor transmitted to the second gear; and an idling section for causing an idle state in which the drive wheel rotates idle in a state where the first gear and the second gear mesh with each other and rotation of the second gear is permitted.

4 Claims, 14 Drawing Sheets

(56) References Cited

U.S. PATENT DOCUMENTS

| | | | |
|---|---|---|---|
| 5,398,617 A * | 3/1995 | Deandrea | B61B 13/02 |
| | | | 105/29.1 |
| 9,687,883 B2 * | 6/2017 | Hayduchok | B07C 3/087 |
| 2014/0277693 A1 * | 9/2014 | Naylor | B65G 1/065 |
| | | | 700/218 |
| 2016/0075533 A1 * | 3/2016 | Scomparin | B66B 9/003 |
| | | | 187/240 |

FOREIGN PATENT DOCUMENTS

| | | |
|---|---|---|
| JP | 6-206679 A | 7/1994 |
| JP | 07-204226 A | 8/1995 |
| JP | 2005-040563 A | 2/2005 |
| WO | 2010/137108 A1 | 2/2010 |

* cited by examiner

TRANSPORT MECHANISM

INCORPORATION BY REFERENCE

The disclosure of Japanese Patent Application No. 2015-056802 filed on Mar. 19, 2015 including the specification, drawings and abstract is incorporated herein by reference in its entirety.

BACKGROUND OF THE INVENTION

1. Field of the Invention

The invention relates to a transport mechanism of a traveling body that travels on a travel rail.

2. Description of Related Art

A transport device of a monorail type configured that a travel body travels along a rail is indicated in Japanese Patent Application Publication No. 6-87436 (JP 6-87436 A), for example. In addition, a technique of a transport mechanism as an elevator for a wheel chair in which wheels of the wheel chair are arranged on rollers that are provided on a floor of the elevator and serve as input sections of drive power, the rollers are rotated by rotating the wheels of the wheel chair, and the rotation of the rollers is further converted into ascending/descending movement of the elevator via the transport mechanism so as to enable ascending/descending of the elevator is indicated in Japanese Patent Application Publication No. 57-51682 (JP 57-51682 A).

It is considered that, if the above transport mechanism is applied to the above transport device, drive wheels can be rotated by a drive source provided in the travel body, and the elevator in which said travel body is arranged can be configured to be able to ascend/descend. However, in the transport mechanism for the travel body configured as such, the rollers are rotationally driven by friction between the drive wheels of the travel body and the rollers of the transport mechanism. Accordingly, slippage possibly occurs between the drive wheels and the rollers, and drive power that is required to drive the transport mechanism cannot possibly be secured.

SUMMARY OF THE INVENTION

The invention provides a transport mechanism in which required drive power is reliably secured and that can reliably move a travel body.

A transport mechanism according to one aspect of the invention is a transport mechanism for transporting a travel body that can self travel and includes: a motor; a drive wheel to which rotary torque of the motor is transmitted; and a first gear to which the rotary torque of the motor is transmitted, and includes: a transport body configured to transport the travel body placed on the transport body, the transport body including a second gear configured to mesh with the first gear of the placed travel body; a movement mechanism configured to move the transport body, on which the travel body is placed, by the rotary torque of the motor transmitted to the second gear; and an idling section that causes an idle state in which the drive wheel rotates idle in a state where the first gear and the second gear mesh with each other and rotation of the second gear is permitted.

In the above aspect, when the state where the first gear and the second gear mesh with each other and the rotation of the second gear is permitted is shifted to the state where the first gear and the second gear mesh with each other and the rotation of the second gear is restricted, the first gear may roll along the second gear, and the idle state of the drive wheel by the idling section may be canceled. In the transport mechanism according to the invention, the first gear rolls along the second gear in the state where the rotation of the second gear is restricted. Accordingly, the travel body that is placed on the transport body is reliably driven, and the travel body can reliably be separated from the transport body. In this way, movement of the travel body by the transport mechanism can reliably be made.

In the above aspect, the movement mechanism may further include a worm gear, a third gear, a pinion gear, and a rack. The second gear may be fixed to a first rotary shaft that is rotatably supported. The worm gear may be configured to be fixed to the first rotary shaft and rotate by the rotation of the second gear, and may mesh with the third gear that is fixed to a second rotary shaft. The pinion gear may be fixed to the second rotary shaft, the pinion gear and the third gear may be configured to unable relative rotation to each other but rotate integrally, and rotation of the first rotary shaft may be configured to be diverted at 90 degrees to an axial direction of the second rotary shaft by the worm gear and the third gear. The pinion gear may mesh with the rack, a longitudinal direction of which aligns with a vertical direction, and the transport body may be configured to move in the vertical direction by rotation of the pinion gear.

In the above aspect, the idling section may be a hole that is formed in a rail section on which the travel body provided in the transport body travels.

According to the transport mechanism of the above aspect, required drive power is reliably secured, and thus the movement of the travel body can reliably be made.

SUMMARY OF THE INVENTION(US)

The invention provides a transport mechanism in which required drive power is reliably secured and that can reliably move a travel body.

A transport mechanism according to one aspect of the invention is a transport mechanism for transporting a travel body that can self travel and includes: a motor; a drive wheel to which rotary torque of the motor is transmitted; and a first gear to which the rotary torque of the motor is transmitted, and includes: a transport body configured to transport the travel body placed on the transport body, the transport body including a second gear configured to mesh with the first gear of the placed travel body; a movement mechanism configured to move the transport body, on which the travel body is placed, by the rotary torque of the motor transmitted to the second gear; and an idling section that causes an idle state in which the drive wheel rotates idle in a state where the first gear and the second gear mesh with each other and rotation of the second gear is permitted.

In the above aspect, when the state where the first gear and the second gear mesh with each other and the rotation of the second gear is permitted is shifted to the state where the first gear and the second gear mesh with each other and the rotation of the second gear is restricted, the first gear may roll along the second gear, and the idle state of the drive wheel by the idling section may be canceled. In the transport mechanism according to the invention, the first gear rolls along the second gear in the state where the rotation of the second gear is restricted. Accordingly, the travel body that is placed on the transport body is reliably driven, and the travel body can reliably be separated from the transport body. In this way, movement of the travel body by the transport mechanism can reliably be made.

According to the transport mechanism of the above aspect, required drive power is reliably secured, and thus the movement of the travel body can reliably be made.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1A:
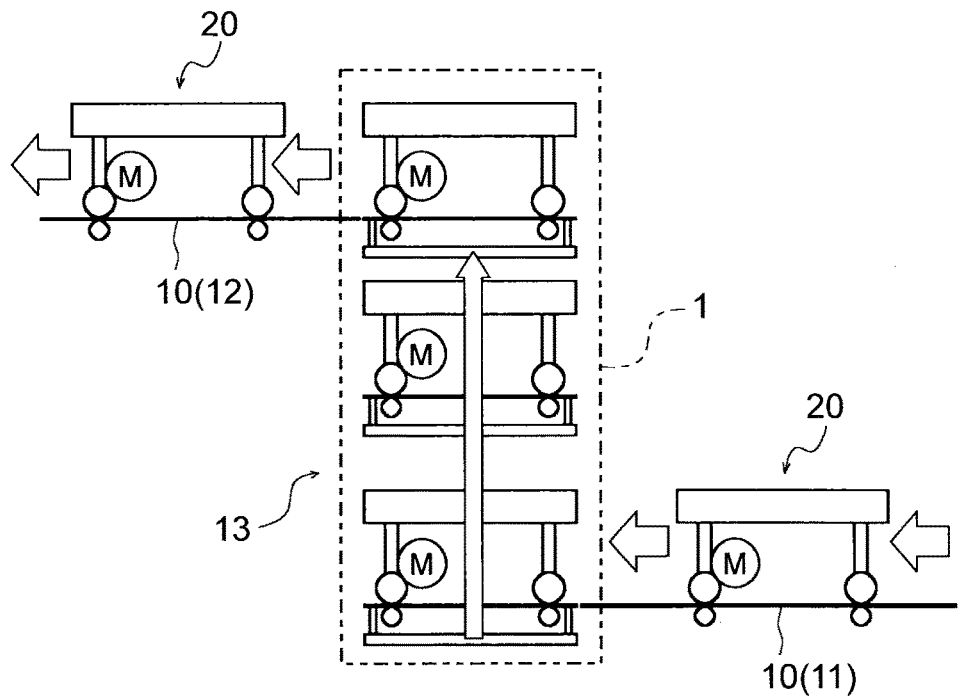
FIG. 1A is a schematic view of an overall configuration of a transport mechanism according to one embodiment (in the case where a transport direction is a vertical direction)

Next, one embodiment of the invention will be described. First, an overall configuration of a transport mechanism according to the one embodiment of the invention will be described by using FIGS. 1A, B and FIGS. 2A, B. As shown in FIG. 1A, a transport mechanism 1 according to the one embodiment of the invention is a mechanism for transporting a travel body 20. The travel body 20 is configured to be able to travel along a travel rail 10.

In the travel rail 10 shown in FIG. 1A, one section is separated from the others, and the sections of the travel rail 10 in front and at rear of the separated section differ in height. Noted that, of the travel rail 10 shown in FIG. 1A, the travel rail 10 that is arranged at a lower position is hereinafter referred to as a low-position side travel rail 11, the travel rail that is arranged at a higher position is referred to as a high-position side travel rail 12, and a separated portion of the travel rail 10 between the travel rails 11, 12 is referred to as a separate section 13.

The transport mechanism 1 is arranged in the separate section 13 of the travel rail 10, and the travel body 20 is transported by the transport mechanism 1 from the low-position side travel rail 11 to the high-position side travel rail 12 and from the high-position side travel rail 12 to the low-position side travel rail 11. That is, the transport mechanism 1 shown in FIG. 1A moves (lifts) the travel body 20 that is located at a level of the low-position side travel rail 11 to the level of the high-position side travel rail 12, so as to allow the travel body 20 to travel on the travel rail 10 that has a height difference in the separate section 13.

Figure 1B:
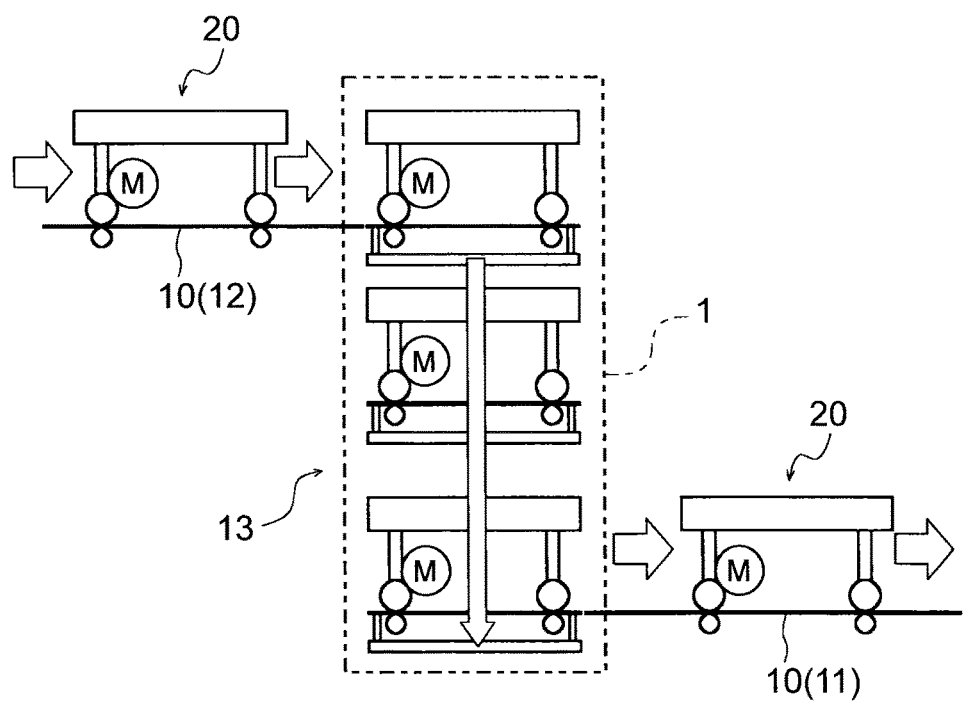
FIG. 1B is a schematic view of the overall configuration of the transport mechanism according to the one embodiment (in the case where the transport direction is the vertical direction)

In addition to movement of the travel body 20 from the low-position side travel rail 11 to the high-position side travel rail 12, as shown in FIG. 1B, the transport mechanism 1 can transport the travel body 20 from the high-position side travel rail 12 to the low-position side travel rail 11. That is, the transport mechanism 1 shown in FIG. 1B can move (lower) the travel body 20 that is located at a level of the high-position side travel rail 12 to the level of the low-position side travel rail 11, so as to allow the travel body 20 to travel on the travel rail 10 that has the height difference in the separate section 13.

Noted that, in FIG. 1A and FIG. 1B, a case where the travel rail 10 has the height difference and the one section of the travel rail 10 is separated from the others is exemplified. However, the transport mechanism 1 can also be applied to a case where one section of the travel rail 10 is separated from the others due to displacement of the travel rail 10 in a horizontal direction.

Figure 2A:
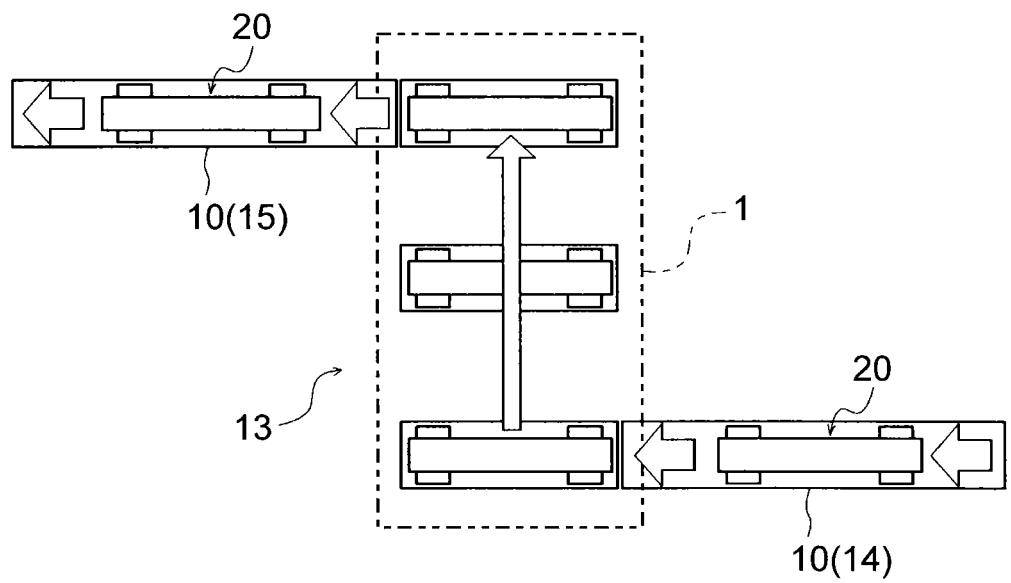
FIG. 2A is a schematic view of the overall configuration of the transport mechanism according to the one embodiment (in the case where the transport direction is a horizontal direction)
Figure 2B:
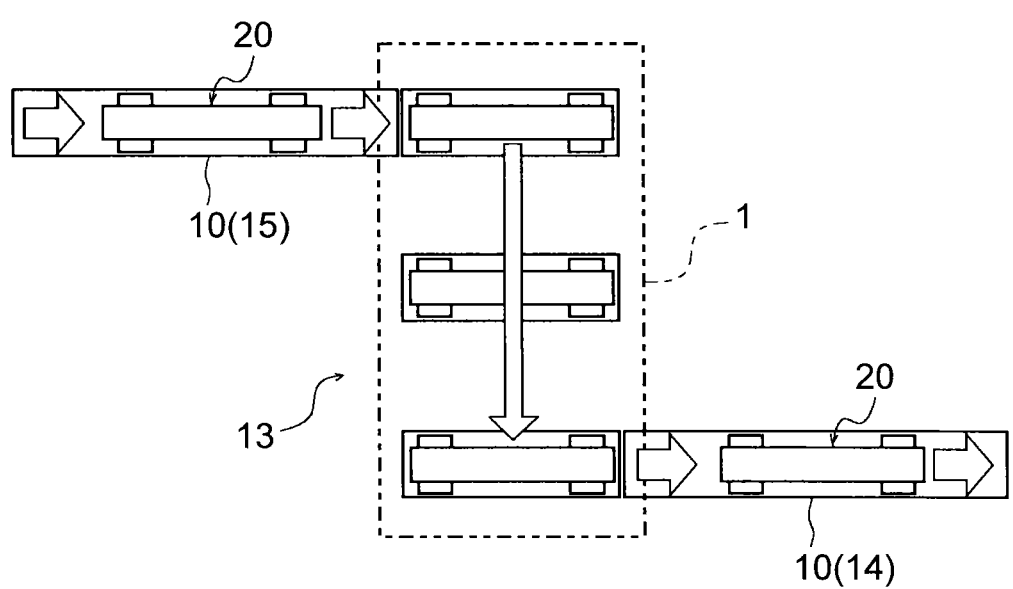
FIG. 2B is a schematic view of the overall configuration of the transport mechanism according to the one embodiment (in the case where the transport direction is the horizontal direction)

In FIGS. 2A, B, a case where sections of the travel rail 10 in front and at the rear of the separate section 13 are displaced in the horizontal direction is exemplified. Noted that, of the travel rail 10 shown in FIGS. 2A, B, the travel rail 10 that is arranged on a right side in the drawings with the separate section 13 being arranged in the middle is referred to as a first travel rail 14 and the travel rail 10 that is arranged on a left side is referred to as a second travel rail 15.

The transport mechanism 1 shown in FIGS. 2A, B is arranged in the separate section 13 of the travel rail 10, and the transport mechanism 1 moves the travel body 20 from the first travel rail 14 to the second travel rail 15 and from the second travel rail 15 to the first travel rail 14. By using the transport mechanism 1 shown in FIGS. 2A, B, the travel body 20 can travel on the travel rail 10, the separate section 13 of which is displaced in a planar arrangement.

Noted that the transport mechanism 1 can have a configuration capable of moving the travel body 20 in the vertical direction and the horizontal direction by combining an aspect of moving the travel body 20 in the vertical direction as shown in FIGS. 1A, B and an aspect of moving the travel body 20 in the horizontal direction as shown in FIGS. 2A, B. According to the transport mechanism 1 with such a configuration, even in the case where the travel rail 10 has the height difference between the sections in front and at the rear of the separate section 13 and the sections in front and at the rear of the separate section 13 are displaced in the horizontal direction, the travel body 20 can be moved, and the travel body 20 can also be moved in inclined directions from the vertical direction and the horizontal direction.

Figure 3:
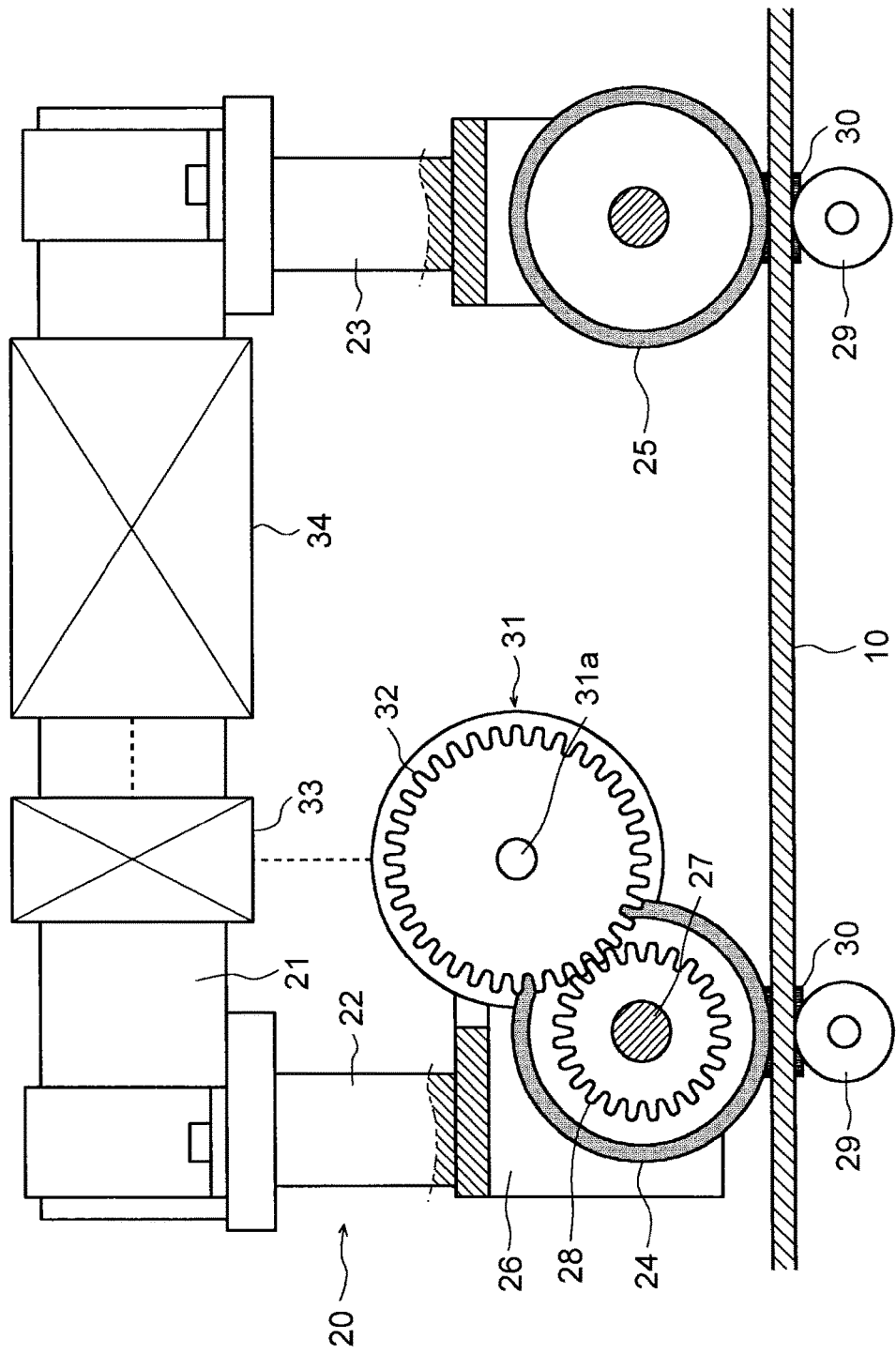
FIG. 3 is a lateral schematic view of a travel body that is a transport target of the transport mechanism according to the one embodiment.
Figure 4:
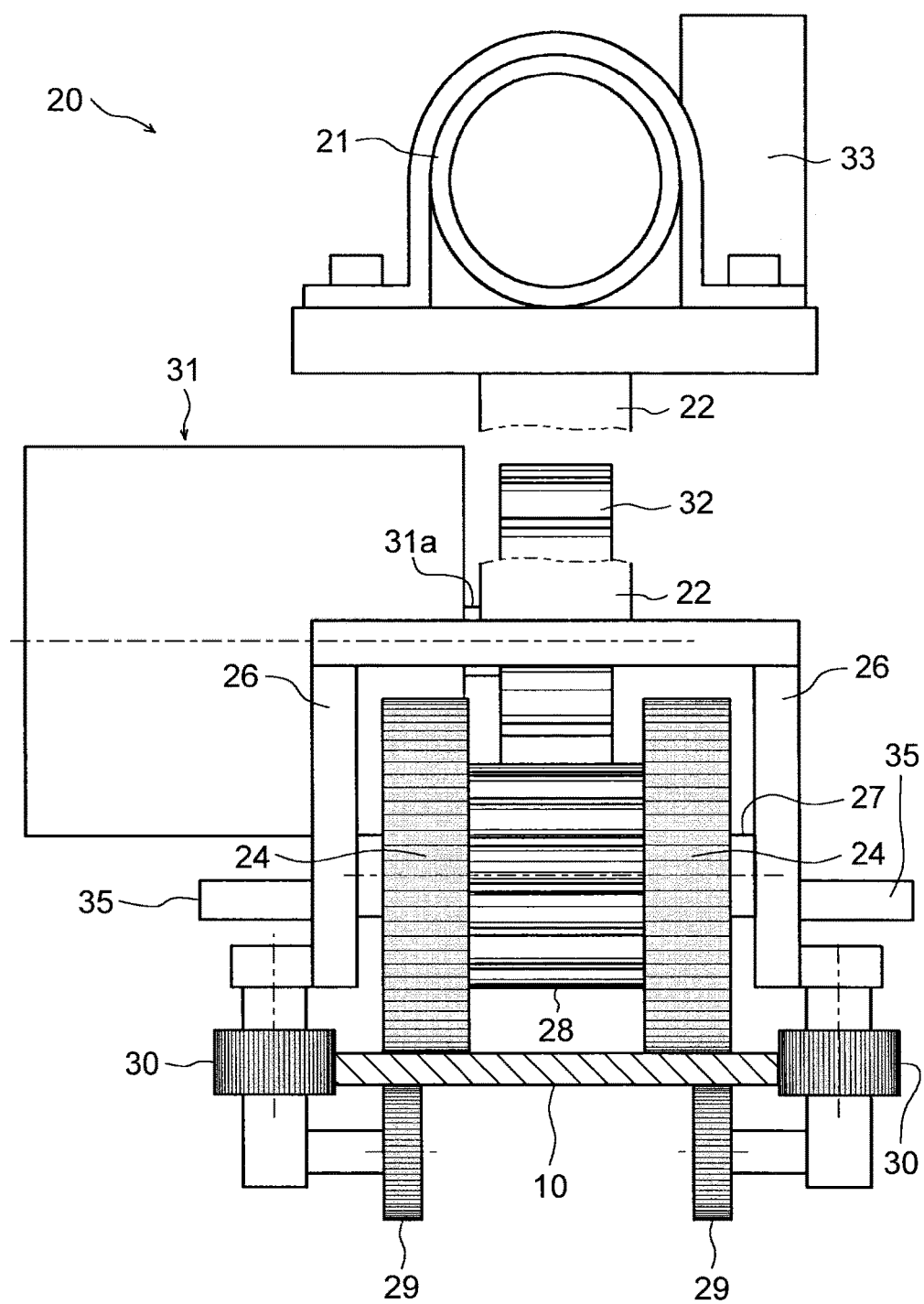
FIG. 4 is a frontal schematic view of the travel body that is the transport target of the transport mechanism according to the one embodiment.

Here, a configuration of the travel body 20 will be described by using FIG. 3 and FIG. 4. As shown in FIG. 3 and FIG. 4, the travel body 20 in the transport mechanism 1 is configured to allow self-traveling on the travel rail 10 and includes a main body section 21, leg sections 22, 23, and the like. Drive wheels 24, 24 are rotatably supported at a lower end of the leg section 22 in the travel body 20, and wheels 25, 25 are rotatably supported at a lower end of the leg section 23.

Paired support sections 26, 26 in arm shapes are provided at the lower end of the leg section 22 in the travel body 20, and a rotary shaft 27 is rotatably supported between the paired support sections 26, 26. The rotary shaft 27 is rotatably supported to the support sections 26, 26 via bearings, which are not shown. The drive wheels 24, 24 are fixed on the rotary shaft 27.

In addition, the travel body 20 includes a motor 31, a controller 33, a battery 34, and the like, and the drive wheels 24, 24 in the travel body 20 are rotationally driven by the motor 31.

In the travel body 20, a first gear 28 is fixed onto the rotary shaft 27 that supports the drive wheels 24, 24. The first gear 28 is a gear to which rotary torque is transmitted (input) from the motor 31, the first gear 28 and the drive wheels 24, 24 are configured to rotate integrally with the rotary shaft 27 being an axis, and the rotary torque is transmitted from the motor 31 to the first gear 28. In this way, the drive wheels 24, 24 are rotationally driven. That is, the rotary torque from the motor 31 is transmitted to the drive wheels 24, 24. Meanwhile, the wheels 25, 25 in the travel body 20 are rotationally driven in conjunction with traveling of the travel body 20. Noted that, in this embodiment, a configuration that the first gear 28 is arranged on the rotary shaft 27 between the paired drive wheels 24, 24 is adopted. However, arrangement positions and the number of units of the drive wheel 24 and the first gear 28 in the travel body 20 are not limited thereto.

In addition, the first gear 28 in the travel body 20 is a gear that also has a function of transmitting the rotary torque of the motor 31 to the outside of the travel body 20, and is configured to be able to transmit the rotary torque that is transmitted from the motor 31 to the first gear 28 to a gear other than the drive wheel 24 by meshing the first gear 28 with the other gear (a second gear 7a, which will be described below).

The travel body 20 includes driven wheels 29 that are located below the drive wheels 24 and the wheels 25 and separated therefrom by a thickness of the travel rail 10, is configured to hold the travel rail 10 from above and below by the drive wheels 24, the wheels 25, and the driven wheels 29, and is also configured that the driven wheels 29 are rotationally driven in conjunction with traveling of the travel body 20. Noted that the driven wheels 29 in the travel body 20 are supported from the support sections 26, 26 via shock absorbers, which are not shown. Due to provision of the driven wheels 29, the travel body 20 absorbs deformation and a fluctuation in thickness of the travel rail 10 during traveling and also absorbs vertical oscillations of the travel body 20 during traveling.

The travel body 20 further includes guide wheels 30, 30 on right and left outer sides with respect to a travel direction of said travel body 20. The guide wheels 30, 30 are arranged at positions at which the guide wheels 30, 30 contact lateral surfaces of the travel rail 10 and are configured to be rotationally driven in conjunction with traveling of the travel body 20. Due to arrangement of the guide wheels 30, 30, displacement of the travel body 20 in right and left directions with respect to the travel direction is suppressed, and the travel body 20 stably travels along the travel rail 10.

The travel body 20 includes the motor 31 as a drive source of said travel body 20, and a motor gear 32 is provided on a rotary shaft 31a of the motor 31. The travel body 20 is configured that the motor 31 is attached to the leg section 22 in the vicinity of the drive wheels 24 and that the motor gear 32 meshes with the first gear 28. With such a configuration, when the motor 31 is actuated and the motor gear 32 rotates, the first gear 28, which meshes with the motor gear 32, rotates, and the drive wheels 24 are rotationally driven. In the case where the second gear 7a meshes with the first gear 28, the second gear 7a is further rotationally driven.

The motor 31 is connected to the battery 34 via the controller 33. The travel body 20 is configured to cause, a current to flow into the motor 31 from the controller 33 based on teaching information that is stored in the controller 33 in advance, change in rotational speed and rotational directions (positive rotation and reverse rotation) of the motor 31, and self-travel while controlling a traveling state (a travel speed and the travel direction) of the travel body 20.

Noted that, although the travel body 20 that includes the drive wheels 24 and the wheels 25 function as the driven wheels is exemplified in this embodiment, the travel body 20 may be configured by including the drive wheels 24 as all of the wheels.

Figure 5:
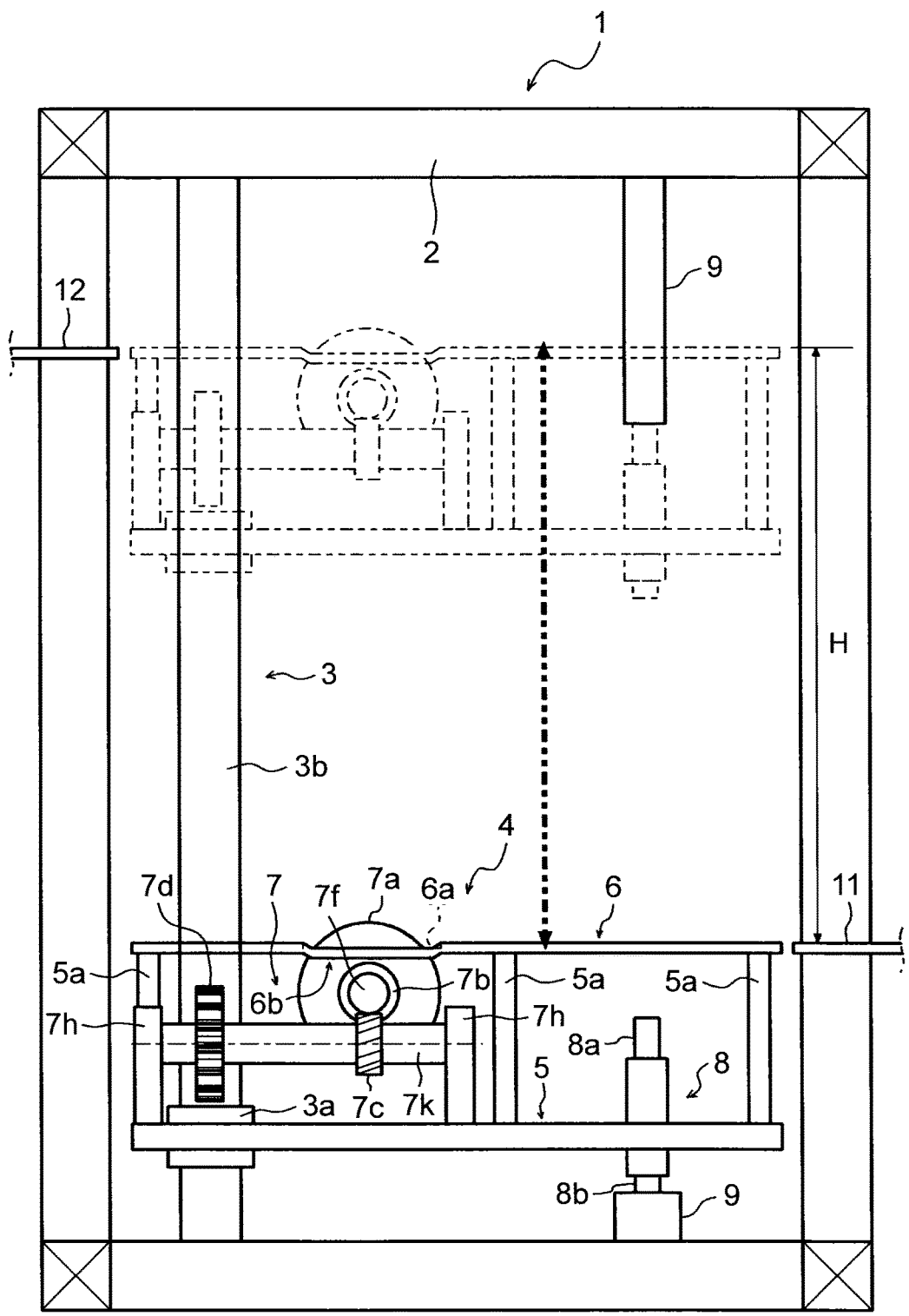
FIG. 5 is a lateral schematic view of the transport mechanism according to the one embodiment.
Figure 6:
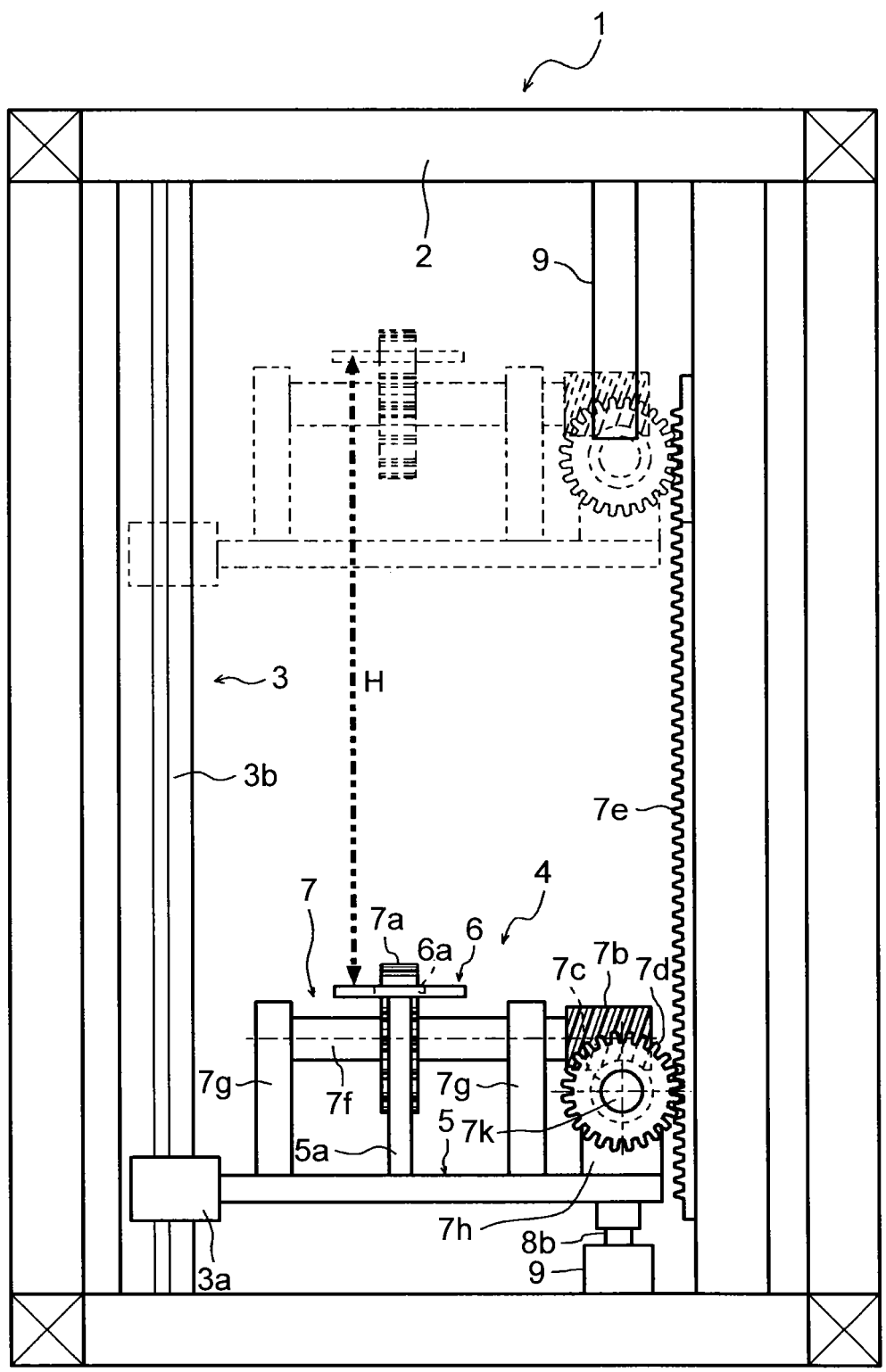
FIG. 6 is a frontal schematic view of the transport mechanism according to the one embodiment.

Here, a configuration of the transport mechanism 1 will further be described in detail by using FIG. 5 and FIG. 6. As shown in FIG. 5 and FIG. 6, the transport mechanism 1 according to the one embodiment includes the travel body 20 (see FIGS. 3, 4), a frame 2, a linear movement guide member 3, a transport body 4, and the like, and is a mechanism that can transport the travel body 20 by the transport body 4.

The linear movement guide member 3 is a member that supports the transport body 4 in a displaceable manner, is configured by including a block section 3a and a rail section 3b, and is configured that the block section 3a can slide linearly along the rail section 3b. That is, in the transport mechanism 1, the transport body 4 is fixed to the block section 3a of the linear movement guide member 3 and is configured to be slidable vertically.

In the transport mechanism 1, in order to make the block section 3a vertically slidable, the linear movement guide member 3 is arranged such that a longitudinal direction of the rail section 3b aligns with the vertical direction, and the linear movement guide member 3 in such a posture is fixed to the frame 2. Noted that, although the linear movement guide member 3 is provided only one in quantity in the transport mechanism 1 described in this embodiment, a configuration, in which two or more of the linear movement guide members 3 are provided, may be adopted.

The transport mechanism 1 is arranged between the low-position side travel rail 11 and the high-position side travel rail 12, and the low-position side travel rail 11 and the high-position side travel rail 12 are separated by a distance H in a height direction.

In the transport mechanism 1, the transport body 4 is configured to be displaceable from the level of the low-position side travel rail 11 to the level of the high-position side travel rail 12 and, as shown in FIG. 5 and FIG. 6, to secure the movable range H. That is, in the transport mechanism 1, a length of the rail section 3b in the linear movement guide member 3 is set to be a length by which the movable range H of the transport body 4 can be secured.

The transport mechanism 1 includes a stopper 8 that restricts ascending and descending of the transport body 4. The stopper 8 in the transport mechanism 1 is configured by including an upper stopper 8a that is attached to an upper surface of a base section 5 of the transport body 4 and a lower stopper 8b that is attached to a lower surface thereof, and is configured to restrict displacement of the base section 5 by making each of the stoppers 8a, 8b abut against a dog 9 that is attached to the frame 2. That is, the base section 5 is configured that further displacement of the base section 5 is prevented when each of the stoppers 8a, 8b abuts against the dog 9 and the base section 5 is displaceable within a range that is held between an upper and lower pair of the dogs 9, 9. Abutment positions of the stoppers 8a, 8b with the dogs 9, 9 are determined in accordance with heights of the low-position side travel rail 11 and the high-position side travel rail 12.

Here, the transport body 4 that constitutes the transport mechanism 1 will be described by using FIG. 5 to FIG. 6. As shown in FIG. 5 and FIG. 6, the transport body 4 is a portion on which the travel body 20 is placed for transportation, and includes the base section 5, a rail section 6, a movement mechanism 7, and the like. The transport body 4 is configured to be vertically slidable within the movable range H by the linear movement guide member 3 because the base section 5 is fixed to the block section 3a.

The rail section 6 is constructed of a plate-shaped member that has substantially the same width and thickness as the travel rail 10, and is fixed to support columns 5a, 5a, 5a that are vertically arranged on the upper surface of the base section 5. The travel body 20 can travel on the rail section 6 and stops at a specified position on the rail section 6 after traveling to the specified position. Then, the travel body 20 is placed on the transport body 4 (on the rail section 6) when being parked at the specified position on the rail section 6. Furthermore, when the transport body 4 moves in a state where the travel body 20 is placed at the specified position on the transport body 4, the travel body 20 moves with the transport body 4.

The movement mechanism 7 is a mechanism that moves the transport body 4 and includes the second gear 7a, a worm gear 7b, a third gear 7c, a pinion gear 7d, a rack 7e, and the like. The movement mechanism 7 is driven when the rotary torque is transmitted from the first gear 28 of the travel body 20, which is placed on the transport body 4, to the second gear 7a.

Noted that, although the second gear 7a meshes with the first gear 28 of the travel body 20 in the transport mechanism 1 of this embodiment, a configuration of the movement mechanism 7 in the transport mechanism 1 is not limited thereto. For example, a configuration that the second gear 7a meshes with the motor gear 32 may be adopted, and only a configuration that the rotary torque is transmitted from a transmission element of the rotary torque for the drive wheel 24 to the second gear 7a needs to be adopted.

The second gear 7a is fixed to a first rotary shaft 7f. The first rotary shaft 7f is rotatably supported by paired support members 7g, 7g that are vertically arranged on the base section 5 at positions below the rail section 6 via bearings, which are not shown.

The second gear 7a is partially exposed to an upper side of the rail section 6 from a rectangular hole 6a that is formed in the rail section 6, and the first gear 28 of the travel body 20 that is placed on the transport body 4 meshes with this portion of the second gear 7a that is exposed to the upper side of the rail section 6.

The movement mechanism 7 is configured that the worm gear 7b is further fixed onto the first rotary shaft 7f, onto which the second gear 7a is fixed, and that the worm gear 7b also rotates by rotation of the second gear 7a.

The worm gear 7b meshes with the third gear 7c. The third gear 7c is a helical gear that is fixed onto a second rotary shaft 7k, and the second rotary shaft 7k is rotatably supported by support members 7h, 7h that are vertically arranged on the base section 5 at positions below the worm gear 7b.

The movement mechanism 7 is configured that the pinion gear 7d is further fixed to the second rotary shaft 7k to which the third gear 7c is fixed and that the third gear 7c and the pinion gear 7d cannot rotate relative to each other but rotate integrally. Noted that, in the movement mechanism 7, rotation of the first rotary shaft 7f is diverted at 90 degrees to an axial direction of the second rotary shaft 7k in a plan view. In addition, in the movement mechanism 7, the second rotary shaft 7k is decelerated for rotation by the worm gear 7b and the third gear 7c, and rotary torque of the second rotary shaft 7k is increased.

In the movement mechanism 7, the pinion gear 7d rotates due to rotation of the second rotary shaft 7k. The pinion gear 7d meshes with the rack 7e. The rack 7e is attached to a lateral surface of the frame 2 that is directed vertically, and a longitudinal direction thereof aligns with the vertical direction.

In the movement mechanism 7, when the pinion gear 7d rotates, said pinion gear 7d rolls in the longitudinal direction of the rack 7e (that is, a sliding direction of the linear movement guide member 3). That is, in the movement mechanism 7, the pinion gear 7d rolls along the rack 7e when the rotary torque is transmitted to the second gear 7a, as a result, the base section 5 to which the pinion gear 7d is attached is vertically displaced, and, furthermore, the transport body 4 is vertically displaced along the linear movement guide member 3.

The transport mechanism 1 is configured to restrict rotation of the second gear 7a in a direction to further lift the transport body 4 when the transport body 4 ascends and the upper stopper 8a abuts against the dog 9. The transport mechanism 1 is also configured to restrict the rotation of the second gear 7a in a direction to further lower the transport body 4 when the transport body 4 descends and the lower stopper 8b abuts against the dog 9. That is, each of the stoppers 8a, 8b is a member that restricts the position of the transport body 4, and also has a role of restricting the rotation of the second gear 7a.

Noted that, although a configuration that the stopper 8 is provided in the base section 5 is adopted in this embodiment, an aspect of the stopper in the transport mechanism 1 is not limited thereto. For example, a configuration that the stopper is attached to the rail section 3b of the linear movement guide member 3, a configuration that the stopper is provided in the rack 7e so as to restrict rotation of the pinion gear 7d, or the like can also be adopted.

Figure 8:
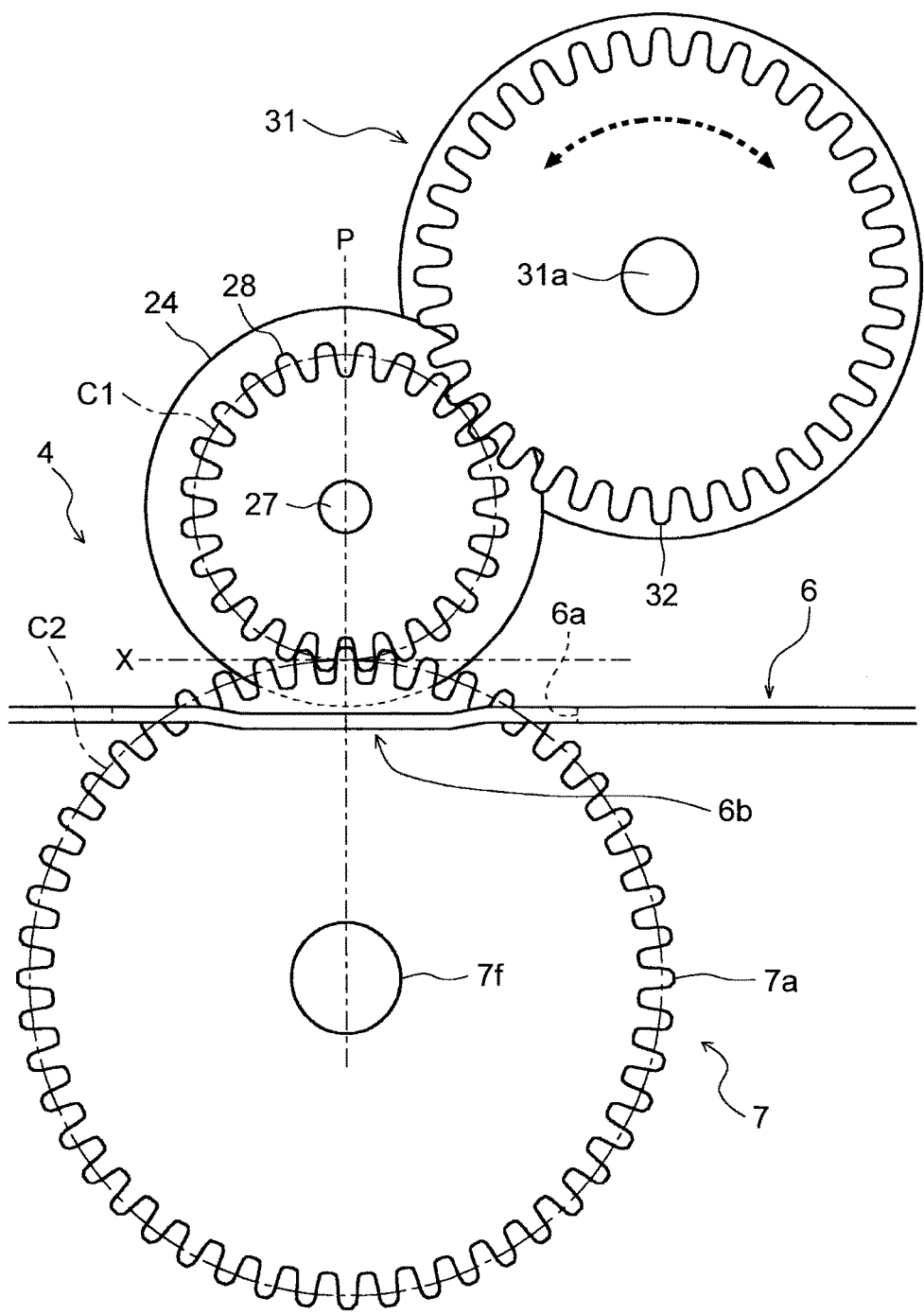
FIG. 8 is a schematic view of a meshing condition between a first gear and a second gear at a time when the travel body is placed on the transport mechanism.

Here, a placement condition of the travel body 20 on the transport body 4 will be described. As shown in FIG. 8, in the transport mechanism 1, a specified stop position P of the travel body 20 in the transport body 4 is defined as a position at which reference circles of the first gear 28 and the second gear 7a that respectively have reference circle diameter C1 and a reference circle diameter C2 are brought into a contact state. In other words, in the transport mechanism 1, the two reference circles of the first gear 28 and the second gear 7a are in contact with each other in a state where the travel body 20 is parked at the stop position P, and the first gear 28 and the second gear 7a mesh with each other in this state. In this embodiment, when the travel body 20 is parked at the stop position P, positions of a rotary axis of the first gear 28 (an axial position of the rotary shaft 27) and a rotary axis of the second gear 7a (an axial position of the first rotary shaft 7f) match each other in the travel direction of the travel body 20 (an extending direction of the rail section 6).

The embodiment shown in FIG. 8 is configured to maintain a state where the reference circle diameter C1 of the first gear 28 is always in contact with a tangent X at a pitch point of each of the reference circle diameters C1, C2 when the travel body 20 travels on the rail section 6. With such a configuration, a height of the drive wheel 24 in the travel body 20 that travels on the rail section 6 is always constant.

As shown in FIG. 8, in the transport mechanism 1, when the travel body 20 is parked at the specified stop position P, the drive wheels 24 are separated from the rail section 6, and the drive wheels 24 are in idle states.

The transport mechanism 1 includes, in the rail section 6, a clearance section 6b as a means for bringing the drive wheels 24 into the idle states. The clearance section 6b is a portion of the rail section 6 that is formed when a portion with which the drive wheels 24 of the travel body 20 parked at the stop position P come in contact is bent downward and offset. It is configured that, in the clearance section 6b, the drive wheels 24 of the travel body 20 parked at the stop position P are separated from the rail section 6.

That is, in the transport mechanism 1, when the travel body 20 is parked at the stop position P, the first gear 28 and the second gear 7a completely mesh with each other, the drive wheels 24 are separated from the rail section 6 and brought into the idle states, and transmission of drive power from the drive wheels 24 to the rail section 6 is blocked. Accordingly, it is configured that transmission loss of the rotary torque caused by contact between the drive wheels 24 and the rail section 6 does not occur and thus the rotary torque can stably be transmitted from the first gear 28 to the second gear 7a.

Here, an operation of the transport mechanism 1 will be described. As shown in FIG. 8, in the transport mechanism 1, the first gear 28 and the second gear 7a mesh with each other, and rotation of the first gear 28 can be transmitted to the second gear 7a in the state where the travel body 20 is parked at the stop position P.

Then, as shown in FIG. 5 and FIG. 6, in the transport mechanism 1, the rotary torque of the motor 31 is transmitted from the first gear 28 to the second gear 7a, and the second gear 7a thereby rotates in the state where the travel body 20 is parked at the stop position P. In this case, the drive wheels 24 are separated from the rail section 6 and rotate idle.

In the transport mechanism 1, when the second gear 7a rotates, the worm gear 7b that is arranged on the first rotary shaft 7f of the second gear 7a rotates, and rotation of the worm gear 7b is transmitted to the third gear 7c that meshes with said worm gear 7b.

In the transport mechanism 1, when the third gear 7c rotates, the pinion gear 7d that is arranged on the second rotary shaft 7k of the third gear 7c rotates. When the pinion gear 7d rotates, said pinion gear 7d rolls along the rack 7e, and the transport body 4 that supports the pinion gear 7d is vertically displaced.

When the movement mechanism 7 is driven, the travel body 20 is placed on the rail section 6 of the transport body 4, and the second gear 7a is rotationally driven by the motor 31 that the travel body 20 itself has. In this way, the travel body 20 itself is displaced with the transport body 4.

Just as described, in the transport mechanism 1, the transport mechanism 1 itself does not have a drive source, and the travel body 20 function as a movement target by the transport mechanism 1 serves as the drive source. It is configured that the transport mechanism 1 is driven when the travel body 20 is placed at the specified stop position P of the transport mechanism 1 and that the travel body 20 is moved by the transport mechanism 1.

Here, a meshing condition between the first gear 28 and the second gear 7a will be described by using FIG. 9 and FIG. 10. Here, a condition from a time at which the travel body 20 starts traveling on the rail section 6 to a time at which the travel body 20 reaches the stop position P will first be described.

Figure 9:
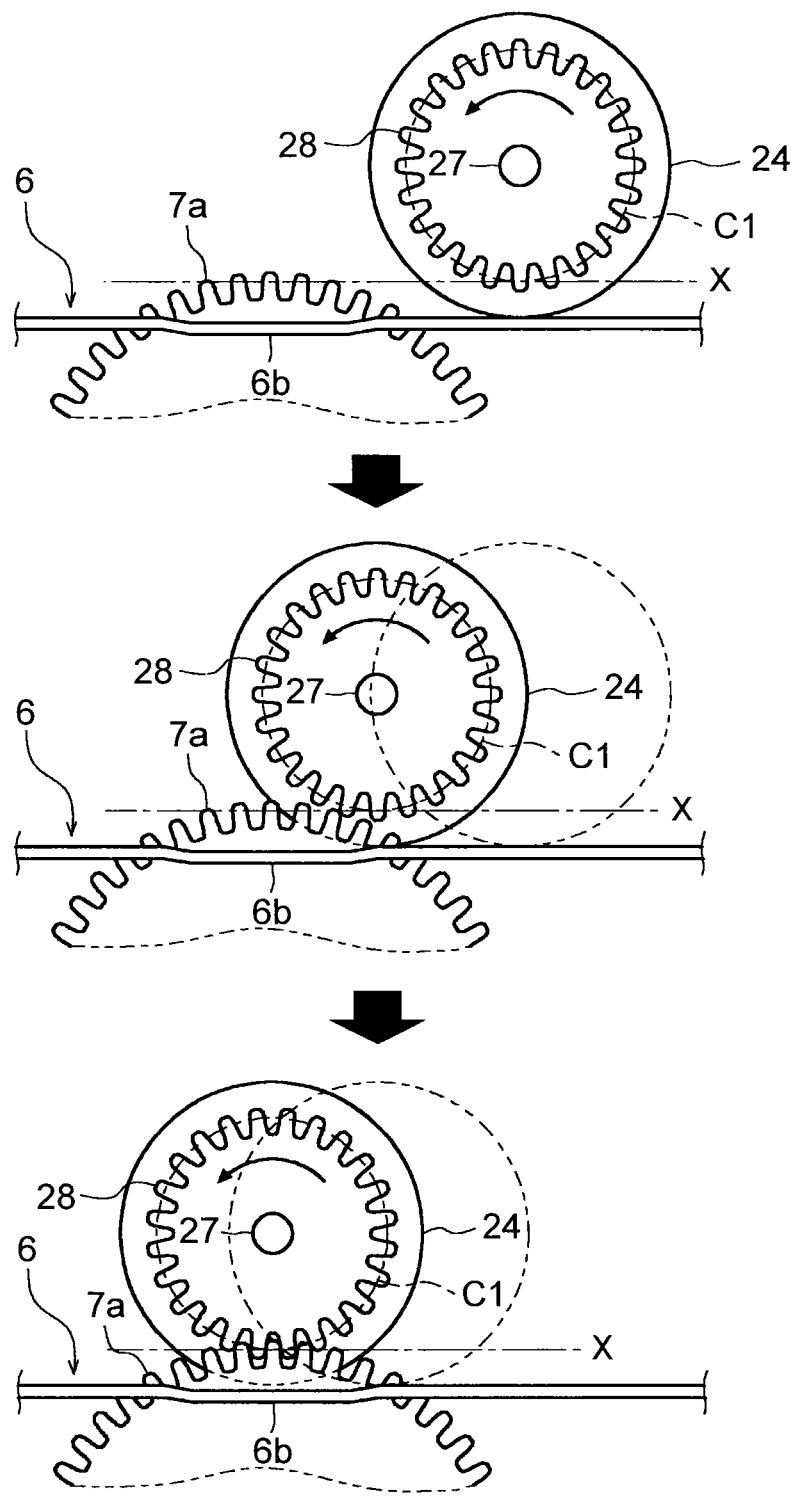
FIG. 9 is a schematic view of a condition at a time when the first gear meshes with the second gear.

As shown in FIG. 9, the transport mechanism 1 is configured that, when the travel body 20 enters the transport body 4, the rail section 6 of the transport body 4 is arranged at the same height as a tip of the low-position side travel rail 11 so as to allow the travel body 20 to sequentially travel from the low-position side travel rail 11 to the rail section 6.

Once the travel body 20 is transferred from the low-position side travel rail 11 to the rail section 6 and proceeds on the rail section 6, the travel body 20 eventually reaches a position at which the first gear 28 and the second gear 7a start meshing with each other.

In the transport mechanism 1, when the first gear 28 and the second gear 7a start meshing with each other, the first gear 28 rolls along the second gear 7a by momentum that is generated by traveling of the travel body 20, the drive wheel 24 of the travel body 20 comes to the clearance section 6b, and the drive wheel 24 of the travel body 20 starts being separated from the rail section 6. Noted that, when the first gear 28 and the second gear 7a start meshing with each other, the rotation of the second gear 7a in a direction in which the transport body 4 ascends is not restricted.

In the transport mechanism 1, when the first gear 28 and the second gear 7a start meshing with each other, the drive wheel 24 of the travel body 20 starts being separated from the rail section 6 at the same time. Accordingly, the drive wheel 24 no longer rubs against the rail section 6 at this time onward. Thus, unstable meshing between the first gear 28 and the second gear 7a that is caused by contact of the drive wheel 24 with the rail section 6 is prevented.

The travel body 20 that travels on the rail section 6 of the transport mechanism 1 eventually reaches the stop position P on the rail section 6 while the first gear 28 meshes with the second gear 7a.

Here, a meshing condition between the first gear 28 and the second gear 7a at a time when the travel body 20 is placed on the rail section 6 and located at the stop position P and that the transport body 4 is displaced will be described.

When the travel body 20 reaches the specified stop position P on the rail section 6, the travel body 20 is parked, the travel body 20 is placed at the stop position P on the rail section 6, and the first gear 28 and the second gear 7a are brought into a completely meshing state. Noted that, when the first gear 28 and the second gear 7a completely mesh with each other, the rotation of the second gear 7a in the direction in which the transport body 4 ascends is not restricted.

In the transport mechanism 1, when the travel body 20 is placed at the stop position P on the rail section 6, the reference circles of the first gear 28 and the second gear 7a that respectively have the reference circle diameter C1 and the reference circle diameter C2 are in the contact state, and the first gear 28 and the second gear 7a completely mesh with each other.

Figure 7:
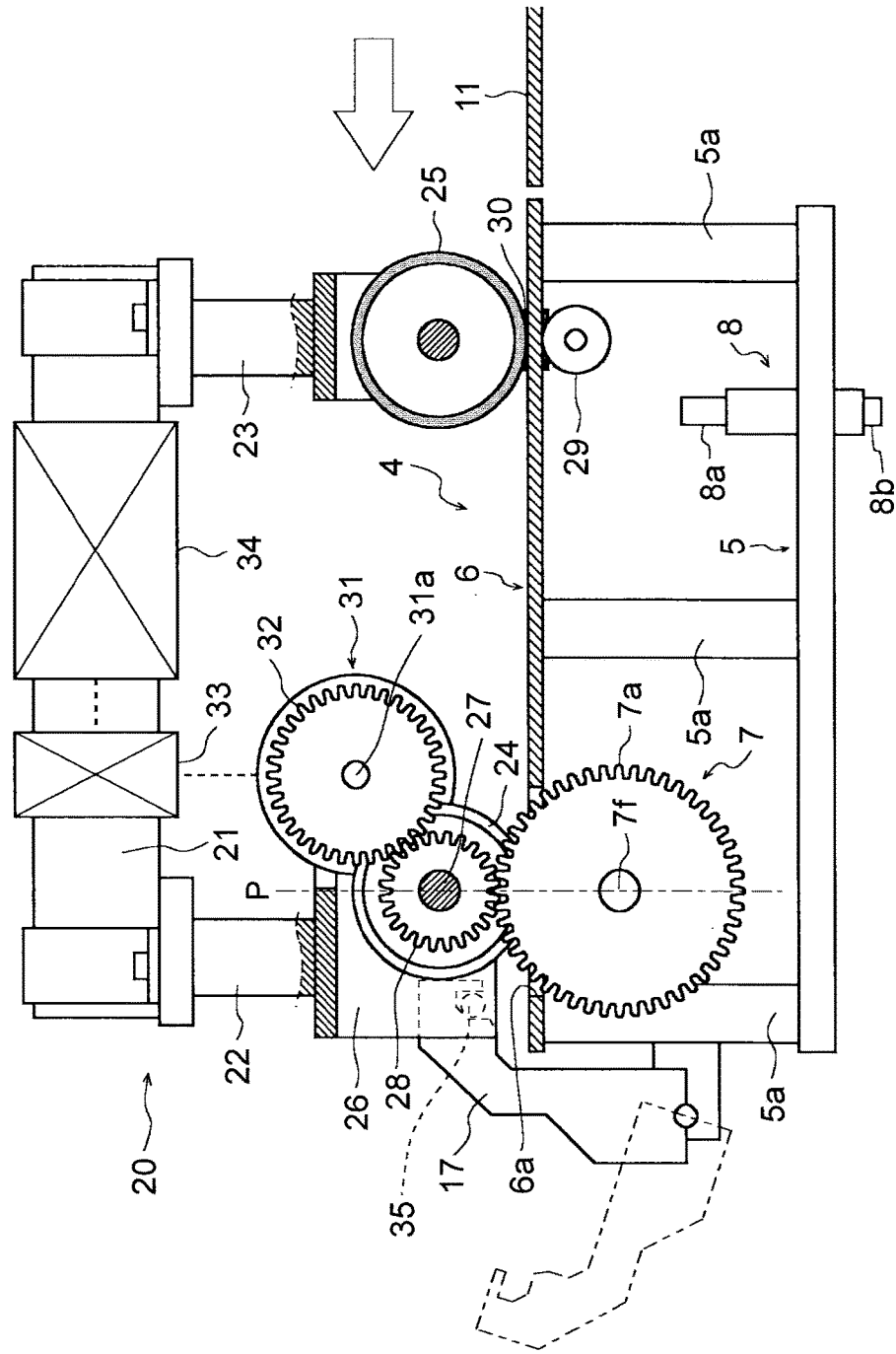
FIG. 7 is a lateral schematic view of a placement condition of the travel body on the transport mechanism according to the one embodiment.

The transport mechanism 1 is configured that, when the travel body 20 reaches the stop position P, a locking section 35 of the travel body 20 is locked by fixing means 17 shown in FIG. 7 and the travel body 20 is fixed to the transport body 4. That is, the travel body 20 is fixed by the fixing means 17 when reaching the stop position P. In this way, the travel body 20 is reliably positioned and parked at the stop position P.

In the transport mechanism 1, the travel body 20 is fixed to the transport body 4 by the fixing means 17. Accordingly, the state where the reference circles of the first gear 28 and the second gear 7a that respectively have the reference circle diameter C1 and the reference circle diameter C2 are in contact with each other is reliably maintained. In this way, a state where the rotary torque is reliably transmitted from the first gear 28 to the second gear 7a is maintained.

As shown in FIG. 7, in the transport mechanism 1, the rotary torque is reliably transmitted from the first gear 28 to the second gear 7a by rotation of the motor 31, and the transport body 4 is displaced (ascends) in a state where the travel body 20 is parked at the stop position P and fixed to the transport body 4 by the fixing means 17.

In the transport mechanism 1, when the transport body 4 reaches a highest position and the displacement of the transport body 4 is restricted by the upper stopper 8a, the rotation of the pinion gear 7d is restricted, and furthermore, the rotation of the second gear 7a is restricted. Noted that the transport mechanism 1 is configured that a height of the rail section 6 matches a height of the high-position side travel rail 12 when the transport body 4 reaches the highest position.

In addition, in the transport mechanism 1, the dog 9 is pressed by the transport body 4 when the transport body 4 reaches the highest position. In this way, the fixing means 17 that fixes the travel body 20 to the transport body 4 is canceled.

That is, the transport mechanism 1 according to the embodiment includes: the travel body 20 that can self travel and includes the motor 31, the drive wheels 24 to which the rotary torque of the motor 31 is transmitted, and the first gear 28 to which the rotary torque of the motor 31 is transmitted; the transport body 4 on which the travel body 20 can be placed, which includes the second gear 7a capable of meshing with the first gear 28 of the placed travel body 20, and which can transport the travel body 20; the movement mechanism 7 that moves the transport body 4 on which the travel body 20 is placed by the rotary torque of the motor 31 that is transmitted to the second gear 7a; and the clearance section 6b function as idling section that brings the drive wheels 24 into the idle states in the state where the first gear 28 and the second gear 7a mesh with each other and the rotation of the second gear 7a is permitted.

The transport mechanism 1 is configured that the transport mechanism 1 is driven by meshing the first gear 28 provided in the travel body 20 and the second gear 7a of the movement mechanism 7, and the rotary torque is thereby reliably transmitted from the travel body 20 to the transport mechanism 1. In this way, the movement of the travel body 20 by the transport mechanism 1 can reliably be made. In addition, in the transport mechanism 1, unstable input of the rotary torque that is caused by rubbing of the drive wheel 24 against the rail section 6 is prevented by the clearance section 6b in the configuration of driving the transport mechanism 1 by the travel body 20, and the rotary torque can thereby reliably be transmitted from the travel body 20 to the transport mechanism 1. In this way, the movement of the travel body 20 by the transport mechanism 1 can reliably be made.

Here, a meshing condition between the first gear 28 and the second gear 7a at a time when the travel body 20 starts off from the stop position P will be described.

Figure 10:
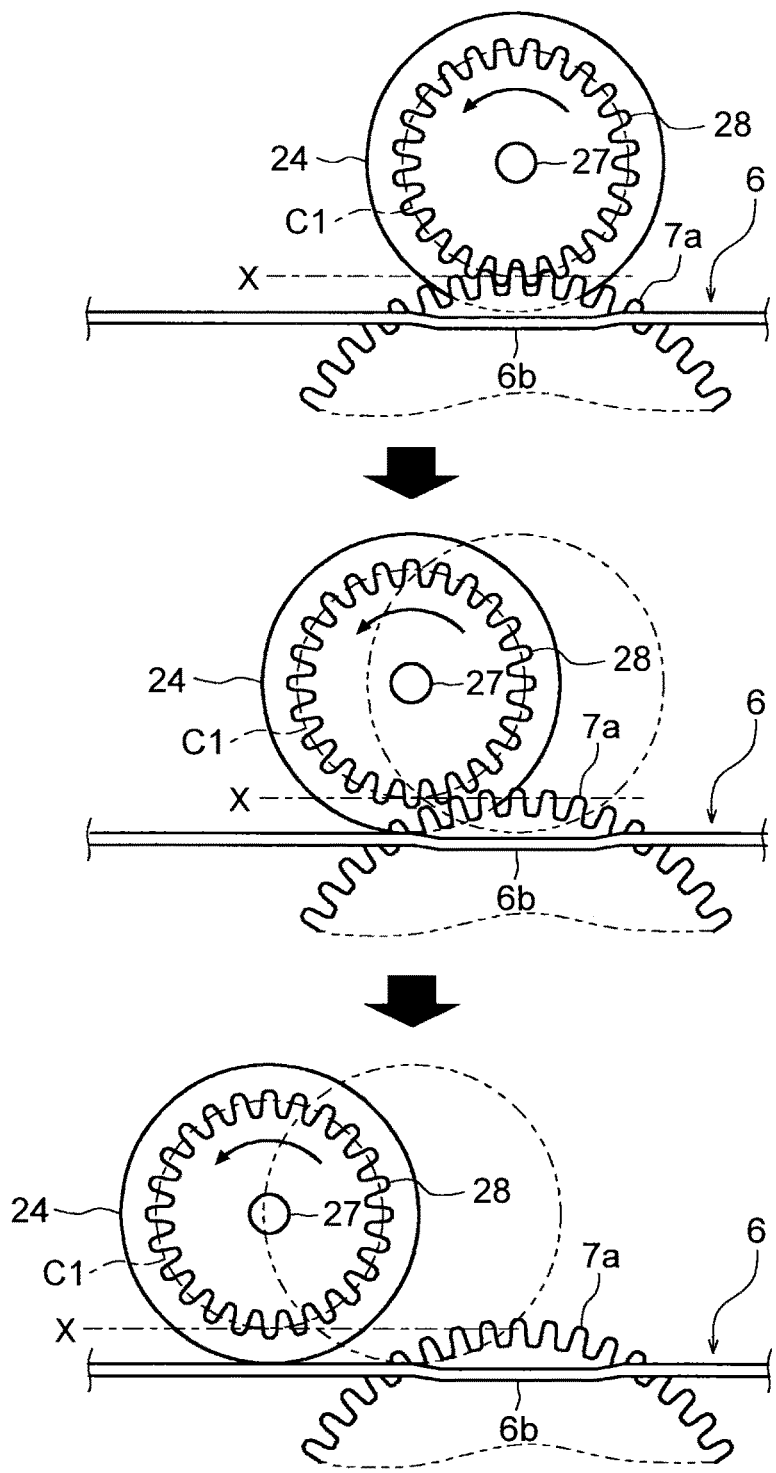
FIG. 10 is a schematic view of a condition at a time when a state where the first gear and the second gear mesh with each other is shifted to a state where the first gear is separated from the second gear.

As shown in FIG. 10, when the transport body 4 reaches the highest position, and the travel body 20 that is parked at the stop position P on the rail section 6 starts off, fixation of the travel body 20 by the fixing means 17 is canceled, and the travel body 20 starts traveling toward the high-position side travel rail 12. Noted that, when the transport body 4 reaches the highest position, the rotation of the second gear 7a in a direction to further lift the transport body 4 (a clockwise direction in FIG. 5) is restricted by the upper stopper 8a.

When the travel body 20 starts off, the drive wheels 24 are first in the separated states from the rail section 6, and the first gear 28 function as a pinion gear rolls along the second gear 7a function as a rack. The travel body 20 is thereby displaced to the high-position side travel rail 12 side, and meshing between the second gear 7a and the first gear 28 gradually becomes shallow. Then, the travel body 20 eventually reaches a position at which the first gear 28 and the second gear 7a no longer mesh with each other. In the transport mechanism 1, when the travel body 20 starts off from the stop position P, the first gear 28 rolls along the second gear 7a. In this way, the travel body 20 reliably starts off without slipping.

The transport mechanism 1 is configured that the drive wheels 24 of the travel body 20 come in contact with the rail section 6 when the first gear 28 rolls along the second gear 7a and the travel body 20 reaches the position at which the first gear 28 and the second gear 7a no longer mesh with each other. In this way, the idle states of the drive wheels 24 by the clearance section 6b are canceled. Then, the travel body 20 is driven by the drive wheels 24 at the time when the drive wheels 24 come in contact with the rail section 6 onward, and is eventually transferred to the high-position side travel rail 12 that is arranged at the tip of the rail section 6.

Noted that the description has been made by exemplifying an operation condition of the travel body 20 at the time when the transport body 4 reaches the highest position. However, an operation condition of the travel body 20 at a time when the travel direction of the travel body 20 is opposite and the transport body 4 reaches a lowest position is the same. That is, when the transport body 4 reaches the lowest position, the rotation of the second gear 7a in the direction to further lower the transport body 4 (a counterclockwise direction in FIG. 5) is restricted, and the first gear 28 function as the pinion gear rolls along the second gear 7a function as the rack. In this way, the travel body 20 can be displaced to the low-position side travel rail 11 side.

That is, in the transport mechanism 1 according to the embodiment, when the state where the first gear 28 and the second gear 7a mesh with each other and the rotation of the second gear 7a is permitted is shifted to the state where the first gear 28 and the second gear 7a mesh with each other and the rotation of the second gear 7a is restricted, the first gear 28 rolls along the second gear 7a, and the idle states of the drive wheels 24 by the clearance section 6b function as idling section are canceled. In the transport mechanism 1, with such a configuration, the travel body 20 in the state of being placed on the transport body 4 can reliably be separated from the transport body 4. In this way, the movement of the travel body 20 by the transport mechanism 1 can reliably be made.

Here, embodiments of the idling section as means for bringing the drive wheels 24 that are provided in the transport body 4 into the idle states will be described by using FIG. 11 to FIG. 14. First, the clearance section 6b that is the idling section shown in FIG. 8 to FIG. 10 will be described.

Figure 11A:
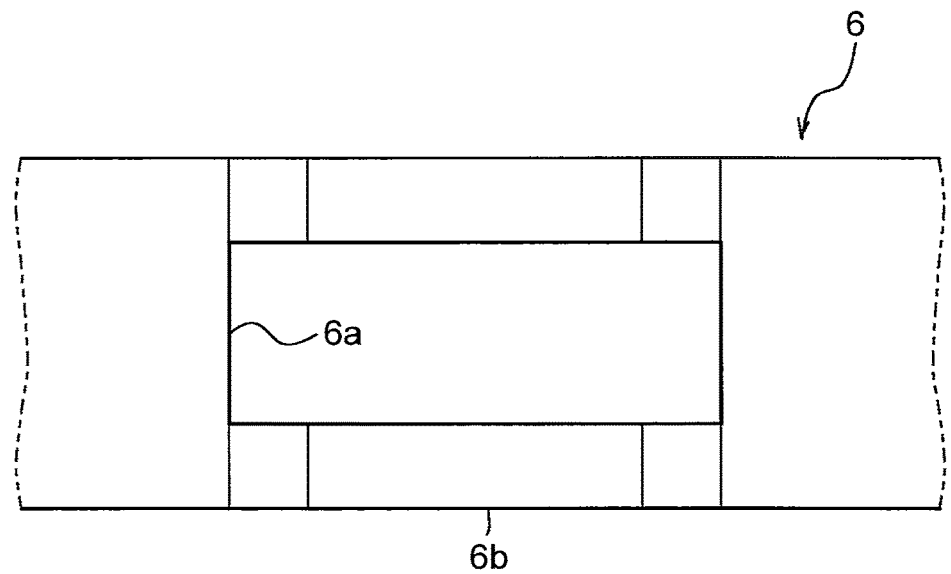
FIG. 11A is a planar schematic view of idling section (a first embodiment) in the transport mechanism.
Figure 11B:
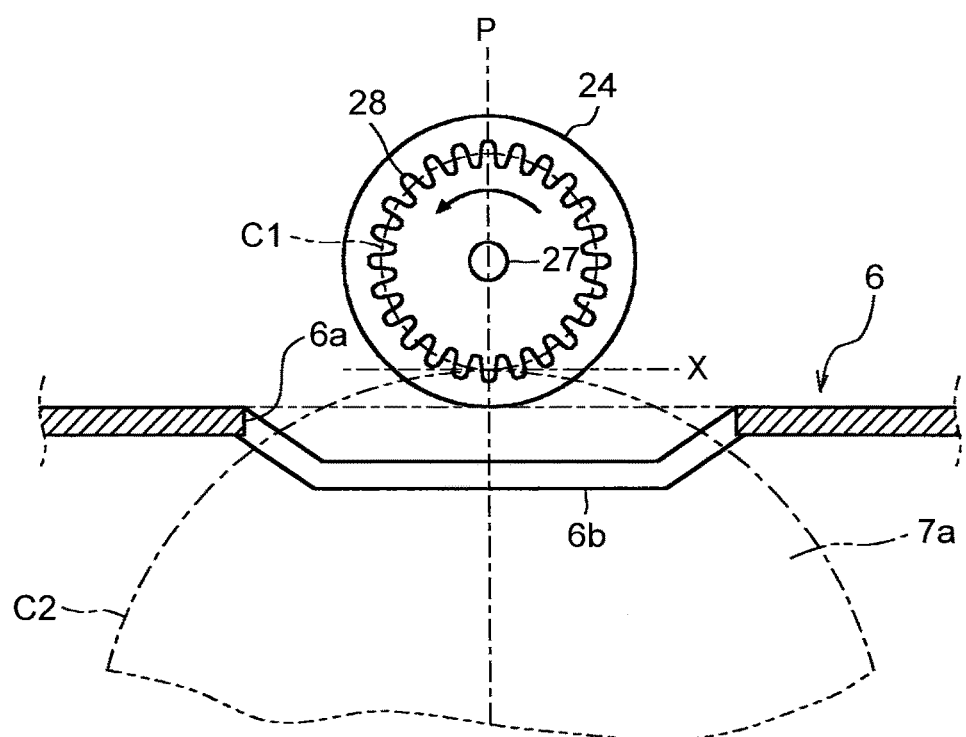
FIG. 11B is a lateral schematic view of the idling section (the first embodiment) in the transport mechanism.

As the idling section that brings the drive wheels 24 into the idle states, the clearance section 6b as shown in FIGS. 11A, B can be adopted. The clearance section 6b is the portion that is formed by bending and offsetting the portion of the rail section 6 downward such that an upper surface position of said rail section 6 is lowered. In the case where the clearance section 6b is adopted, the drive wheels 24 are separated from the rail section 6 as a driven surface. Accordingly, the transmission of the drive power of the drive wheels 24 to the rail section 6 can be prevented. Noted that, in the case where the clearance section 6b is adopted, the heights of the drive wheels 24 of the travel body 20 on the rail section 6 are never changed. Thus, the first gear 28 and the second gear 7a can smoothly mesh with each other.

Figure 12A:
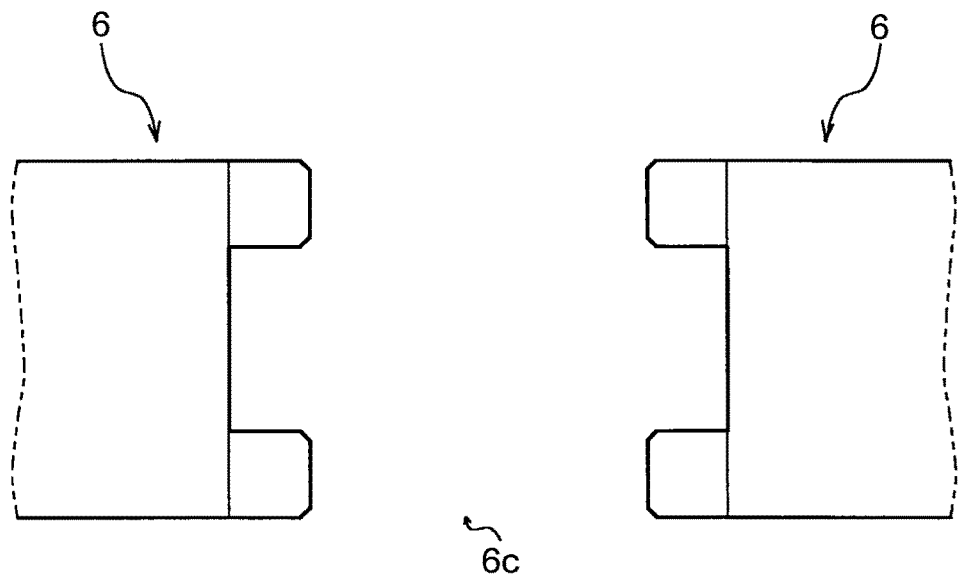
FIG. 12A is a planar schematic view of idling section (a second embodiment) in the transport mechanism.
Figure 12B:
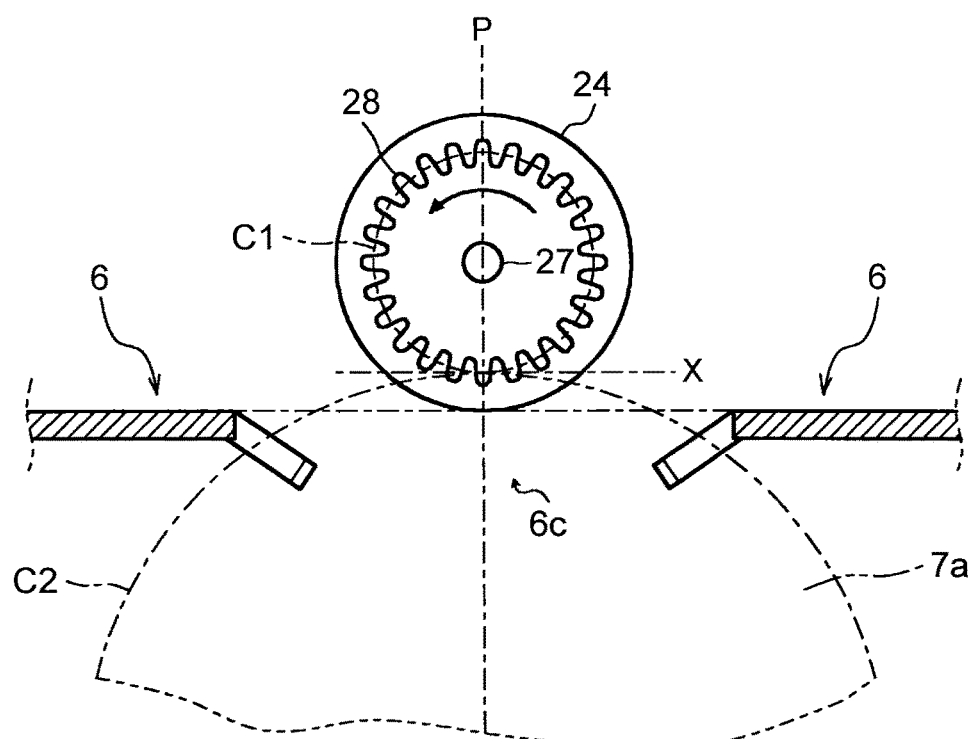
FIG. 12B is a lateral schematic view of the idling section (the second embodiment) in the transport mechanism.

In addition, as the idling section that brings the drive wheels 24 into the idle states, a clearance section 6c as shown in FIGS. 12A, B can be adopted. The clearance section 6c as separating means shown in FIGS. 12A, B is configured that a range of the rail section 6 with which the drive wheels 24 are in contact while the first gear 28 and the second gear 7a mesh with each other is cut off from the rail section 6, so as to form the clearance section 6c as a portion in which the rail section 6 does not exist and that the drive wheels 24 are separated from the rail section 6 by the clearance section 6c. In the case where the clearance section 6c is adopted, the drive wheels 24 are separated from the rail section 6 as the driven surface. Accordingly, the transmission of the drive power of the drive wheels 24 to the rail section 6 can be prevented. Noted that, in the case where the clearance section 6c is adopted, the heights of the drive wheels 24 of the travel body 20 on the rail section 6 are never changed. Thus, the first gear 28 and the second gear 7a can smoothly mesh with each other.

Figure 13:
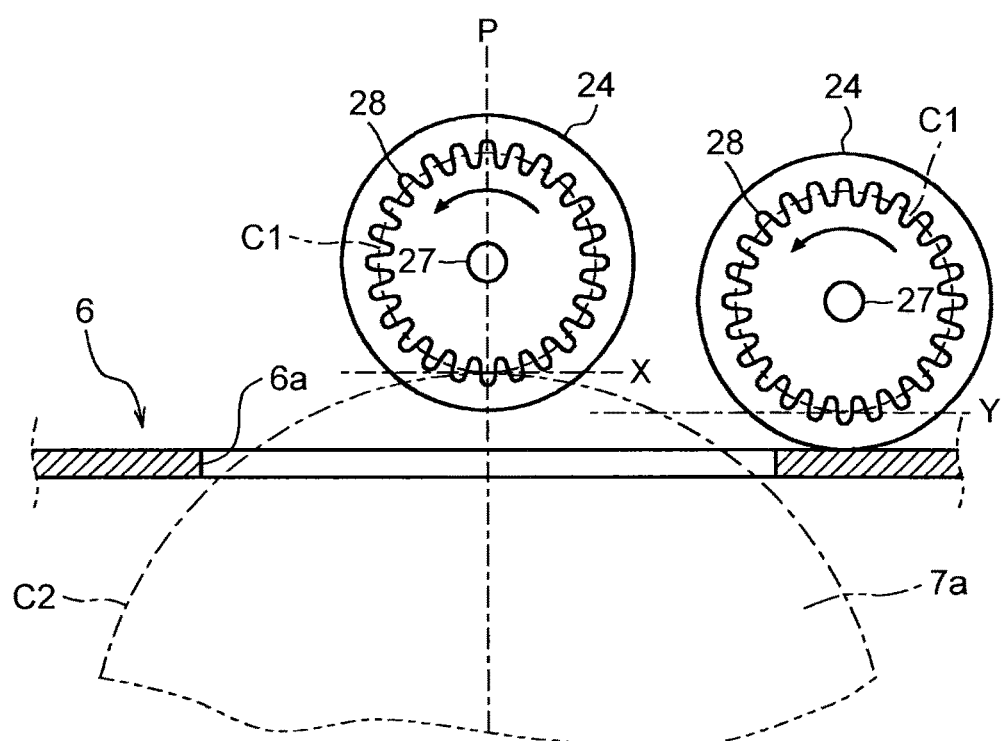
FIG. 13 is a lateral schematic view of idling section (a third embodiment) in the transport mechanism.

Furthermore, the embodiment shown in FIG. 13 can be adopted as the idling section that brings the drive wheels 24 into the idle states. The embodiment shown in FIG. 13 is configured that a height in which the second gear 7a is projected upward from the rail section 6 is increased to be greater than that in the case shown in FIG. 11 and the second gear 7a thereby has a function as the idling section.

The embodiment shown in FIG. 13 is configured that a tangent Y of the reference circle diameter C1 of the first gear 28 at the time when the drive wheels 24 of the travel body 20 are in contact with the rail section 6 does not match the tangent X at the pitch point of each of the reference circle diameters C1, C2, and a distance of the tangent X from the rail section 6 is set to be longer than a distance of the tangent Y from the rail section 6. Noted that, because a clearance section is not formed in the rail section 6 in this case, differing from the case shown in FIG. 11A, the upper surface of the rail section 6 is always retained to have a constant height before/while/after the first gear 28 and the second gear 7a mesh with each other.

In such a configuration, the first gear 28 rolls while running onto the second gear 7a during the time when the first gear 28 and the second gear 7a mesh with each other. Accordingly, the rotary shaft 27 of the first gear 28 is raised from a height thereof at which the travel body 20 is in contact with the rail section 6 and travels, and the drive wheels 24 are floated from the rail section 6.

That is, the embodiment shown in FIG. 13 is configured that the drive wheels 24 are floated upward while the first gear 28 and the second gear 7a mesh with each other by increasing an exposed height of the second gear 7a, so as to separate the drive wheels 24 from the rail section 6. In addition, in the embodiment shown in FIG. 13, the drive wheels 24 are separated from the rail section 6 as the driven surface, and the transmission of the drive power of the drive wheels 24 to the rail section 6 can thereby be prevented.

Figure 14:
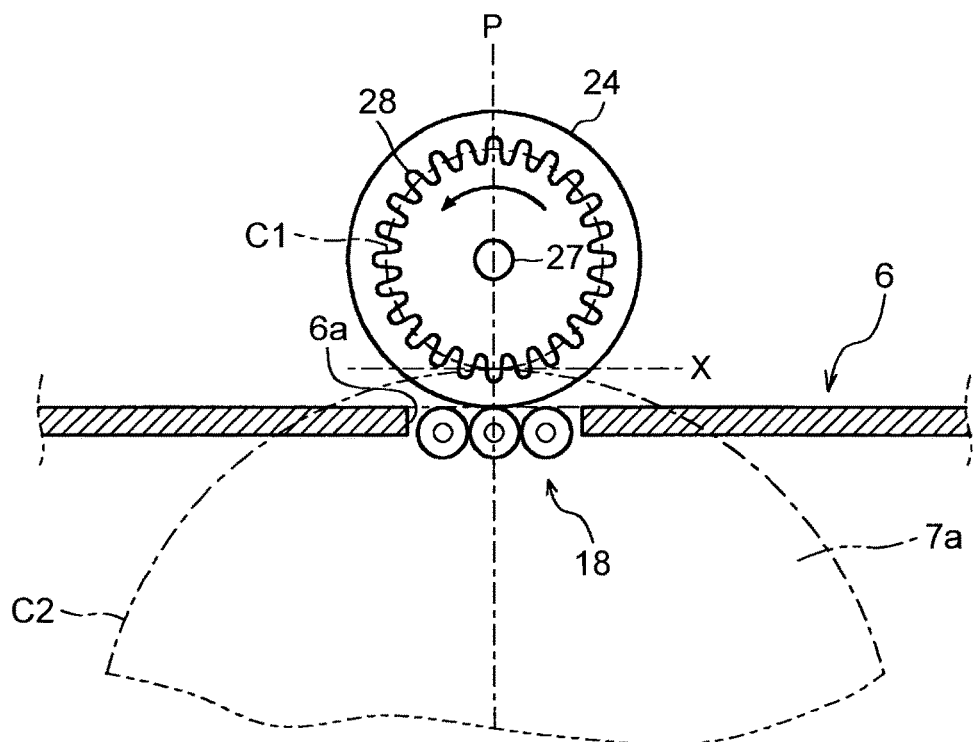
FIG. 14 is a lateral schematic view of idling section (a fourth embodiment) in the transport mechanism.

Furthermore, an idle roller 18 as shown in FIG. 14 can be adopted as the idling section that brings the drive wheels 24 into the idle states. An embodiment shown in FIG. 14 is configured that the drive wheels 24 rotate idle and the transmission of the drive power of the drive wheels 24 to the rail section 6 is prevented by replacing the range of the rail section 6, with which the drive wheels 24 are in contact while the first gear 28 and the second gear 7a mesh with each other, with the idle roller 18. In the case where the idle roller 18 is adopted, the transmission of the drive power of the drive wheels 24 to the rail section 6 can be prevented without separating the drive wheels 24 from the driven surface.

What is claimed is:

1. A transport mechanism, comprising:
   a travel body that includes a motor, a drive wheel to which rotary torque of the motor is transmitted; and a first gear to which the rotary torque of the motor is transmitted and that can self-travel:
   a transport body configured to transport the travel body placed on the transport body, the transport body including a second gear configured to mesh with the first gear of the placed travel body;
   a movement mechanism configured to move the transport body, on which the travel body is placed, by the rotary torque of the motor transmitted to the second gear; and
   an idling section that causes an idle state in which the drive wheel rotates idle in a state where the first gear and the second gear mesh with each other and rotation of the second gear is permitted.

2. The transport mechanism according to claim 1, wherein when the state where the first gear and the second gear mesh with each other and the rotation of the second gear is permitted is shifted to the state where the first gear and the second gear mesh with each other and the rotation of the second gear is restricted, the first gear rolls along the second gear, and the idle state of the drive wheel by the idling section is canceled.

3. The transport mechanism according to claim 1, wherein the movement mechanism further includes a worm gear, a third gear, a pinion gear, and a rack,
   the second gear is fixed to a first rotary shaft that is rotatably supported,
   the worm gear is configured to be fixed to the first rotary shaft and rotate by the rotation of the second gear,
   the worm gear meshes with the third gear that is fixed to a second rotary shaft,
   the pinion gear is fixed to the second rotary shaft, the pinion gear and the third gear are configured to unable relative rotation to each other but rotate integrally, rotation of the first rotary shaft is configured to be diverted at 90 degrees to an axial direction of the second rotary shaft by the worm gear and the third gear, and the pinion gear meshes with the rack, a longitudinal direction of which aligns with a vertical direction, and the transport body is configured to move in the vertical direction by rotation of the pinion gear.

4. The transport mechanism according to claim 1, wherein the idling section is a hole that is formed in a rail section on which the travel body provided in the transport body travels.

\* \* \* \* \*